United States Patent [19]

Ward

[11] Patent Number: 4,743,354

[45] Date of Patent: * May 10, 1988

[54] PROCESS FOR PRODUCING A PRODUCT HYDROCARBON HAVING A REDUCED CONTENT OF NORMAL PARAFFINS

[75] Inventor: John W. Ward, Yorba Linda, Calif.

[73] Assignee: Union Oil Company of California, Los Angeles, Calif.

[*] Notice: The portion of the term of this patent subsequent to Mar. 10, 2004 has been disclaimed.

[21] Appl. No.: 916,196

[22] Filed: Oct. 10, 1986

Related U.S. Application Data

[60] Continuation-in-part of Ser. No. 593,439, Mar. 26, 1984, Pat. No. 4,648,958, which is a continuation-in-part of Ser. No. 531,924, Sep. 13, 1983, Pat. No. 4,517,074, which is a division of Ser. No. 084,761, Oct. 15, 1979, Pat. No. 4,419,271.

[51] Int. Cl.$^4$ .............................................. C10G 65/12
[52] U.S. Cl. ..................................... 208/59; 208/18; 208/89; 208/109; 208/111; 208/216 R; 208/217; 208/254 H
[58] Field of Search ....................... 208/18, 59, 88, 89, 208/91, 111, 68, 109, 216 R, 217, 254 H

[56] References Cited

U.S. PATENT DOCUMENTS

| | | | |
|---|---|---|---|
| 3,242,068 | 3/1966 | Paterson | 208/111 |
| 3,251,902 | 5/1966 | Garwood et al. | 208/134 |
| 3,267,021 | 8/1966 | Gould | 208/78 |
| 3,277,081 | 10/1966 | Plank et al. | 502/8 |
| 3,312,615 | 4/1967 | Cramer et al. | 208/120 |
| 3,444,071 | 5/1969 | Van Zijll Langhout | 208/59 |
| 3,487,005 | 12/1969 | Egan et al. | 208/59 |
| 3,542,670 | 11/1970 | Erickson et al. | 208/120 |
| 3,617,483 | 11/1971 | Child et al. | 208/59 |
| 3,684,691 | 8/1972 | Arey et al. | 208/59 |
| 3,700,585 | 10/1972 | Chen et al. | 208/111 |
| 3,729,521 | 4/1973 | Gutberlet et al. | 585/475 |
| 3,781,199 | 12/1973 | Ward | 208/89 |
| 3,783,124 | 1/1974 | Ruben et al. | 208/111 |
| 3,788,972 | 1/1974 | Henry et al. | 208/59 |
| 3,790,472 | 2/1974 | White | 208/59 |
| 3,835,027 | 9/1974 | Ward | 208/111 |
| 3,838,040 | 9/1974 | Ward | 208/111 |
| 3,853,742 | 12/1974 | Ward | 208/111 |
| 3,880,746 | 4/1975 | Bennett et al. | 208/59 |
| 3,894,938 | 7/1975 | Gorring et al. | 208/59 |
| 3,897,327 | 7/1975 | Ward | 208/111 |
| 3,909,450 | 9/1975 | O'Hara | 208/111 |
| 3,926,780 | 12/1975 | Ward | 208/111 |
| 3,929,672 | 12/1975 | Ward | 502/66 |
| 3,945,943 | 3/1976 | Ward | 502/66 |
| 3,992,283 | 11/1976 | Hutchings | 208/59 |
| 3,997,618 | 12/1976 | Cornely et al. | 585/481 |
| 4,002,698 | 1/1977 | Kaeding | 585/454 |
| 4,061,724 | 12/1977 | Grose et al. | 423/335 |
| 4,062,809 | 12/1977 | Ward | 502/219 |
| 4,085,068 | 4/1978 | Gallagher et al. | 502/254 |
| 4,089,775 | 5/1978 | Berger et al. | 208/111 |
| 4,097,365 | 6/1978 | Ward | 208/111 |
| 4,104,294 | 8/1978 | Grose et al. | 502/62 |
| 4,115,248 | 9/1978 | Mulaskey | 208/112 |
| 4,120,825 | 10/1978 | Ward | 502/64 |
| 4,121,996 | 10/1978 | Hilfman | 208/111 |
| 4,153,540 | 5/1979 | Gorring et al. | 208/89 |
| 4,175,114 | 11/1979 | Plank et al. | 423/329 |
| 4,179,356 | 12/1979 | O'Hara et al. | 208/111 |
| 4,229,282 | 10/1980 | Peters et al. | 208/111 |
| 4,238,316 | 12/1980 | Mooi et al. | 208/58 |
| 4,292,166 | 9/1981 | Gorring et al. | 208/59 |
| 4,294,687 | 10/1981 | Pinaire et al. | 208/58 |
| 4,309,275 | 1/1982 | Mulaskey | 208/109 |
| 4,310,440 | 1/1982 | Wilson et al. | 423/305 |
| 4,342,641 | 8/1982 | Reif et al. | 208/89 |
| 4,361,477 | 11/1982 | Miller | 208/18 |
| 4,414,097 | 11/1983 | Chester et al. | 208/18 |
| 4,419,271 | 12/1983 | Ward | 208/111 |
| 4,428,862 | 1/1984 | Ward et al. | 208/59 |
| 4,431,517 | 2/1984 | Nevitt et al. | 208/111 |
| 4,437,975 | 3/1984 | Gillespie et al. | 208/111 |
| 4,517,074 | 5/1985 | Ward | 208/111 |
| 4,597,854 | 7/1986 | Penick | 208/111 |

FOREIGN PATENT DOCUMENTS

| | | | |
|---|---|---|---|
| 2906656 | 8/1979 | Fed. Rep. of Germany | 502/79 |
| 2024796 | 1/1980 | United Kingdom | 208/111 |

Primary Examiner—Helen M. S. Sneed
Assistant Examiner—Anthony McFarlane
Attorney, Agent, or Firm—Yale S. Finkle; Gregory F. Wirzbicki; Dean Sandford

[57] ABSTRACT

A waxy hydrocarbon feedstock is converted into a product hydrocarbon of reduced normal paraffin content by either dewaxing or hydrodewaxing the feedstock in the presence a dewaxing or hydrodewaxing catalyst under conditions such that the normal paraffin content of the feedstock is reduced by selectively converting waxy paraffins into lower molecular weight hydrocarbons. At least a portion of the effluent from the dewaxing or hydrodewaxing zone is then passed to a hydrocracking zone where it is contacted with a hydrocracking catalyst in the presence of hydrogen under conditions such that a further reduction in the normal paraffin content is effected. When the desired product is a lube oil base stock, the overall conversion of components in the feed boiling above about 650° F. to components boiling at or below about 650° F. that takes palce in the dewaxing or hydrodewaxing step and the hydrocracking step combined is no more than about 20 volume percent, preferably no more than about 10 volume percent. When the desired product is a middle distillate, the overall conversion of feedstock constituents in the dewaxing or hydrodewaxing step and the hydrocracking step combined to components boiling below about 300° F. is no more than about 25 volume percent, preferably no more than about 15 volume percent.

40 Claims, No Drawings

PROCESS FOR PRODUCING A PRODUCT HYDROCARBON HAVING A REDUCED CONTENT OF NORMAL PARAFFINS

CROSS REFERENCE TO RELATED APPLICATIONS

This application is a continuation-in-part of U.S. pat. application Ser. No. 593,439, filed in the U.S. Pat. and Trademark Office on Mar. 26, 1984 and now U.S. Pat. No. 4,648,958, which is a continuation-in-part of U.S. pat. application Ser. No. 531,924, filed in the U.S. Pat. and Trademark Office on Sept. 13, 1983 and now U.S. Pat. No. 4,517,074, which is a divisional of U.S. pat. application Ser. No. 084,761 filed in the U.S. Pat. and Trademark Office on Oct. 15, 1979 and now U.S. Pat. 4,419,271.

BACKGROUND OF THE INVENTION

This invention relates to a process for converting a waxy hydrocarbon feedstock into a high quality product hydrocarbon having a reduced concentration of normal paraffins. It is particularly concerned with a process for producing a lube oil base stock having a relatively low pour point or a middle distillate having either a low freeze point or both a low pour point and low cloud point from a full boiling range shale oil.

Many liquid hydrocarbon feedstocks contain relatively high concentrations of straight chain and slightly branched chain aliphatic compounds having between 8 and 40 carbon atoms. These long chain compounds tend to crystallize on cooling of the hydrocarbon oil. This crystallization is quite frequently sufficient to hinder the flow of the liquid hydrocarbon and prevent it from being pumped or transmitted from one location to another. The temperature at which the hydrocarbon oil will not flow is commonly referred to as the "pour point" and is determined by standardized test procedures. One such feedstock having a relatively high pour point is the raw oil obtained by retorting oil shale, such as the oil shale found in the Colorado River formation in the western United States.

Oil shale is a mixture of a minor amount of solid organic matter known as kerogen and a major amount of mineral matter. Hydrocarbons are normally recovered from oil shale by subjecting it to heat via pyrolysis or retorting at temperatures between about 850° F. and about 1000° F. These high temperatures cause the kerogen to decompose into liquid and light gaseous hydrocarbonaceous products. The liquids recovered by condensing the oil shale vapors will normally contain a relatively high concentration of straight and slightly branched chain paraffins of high molecular weight. This high concentration of waxy components typically results in the oil having a relatively high pour point, normally between about 50° F. and about 90° F. In addition, the raw shale oil will contain arsenic, organonitrogen constituents and/or organosulfur constituents.

U.S. Pat. No. 4,153,540 teaches a method of upgrading raw shale oil by removing the organonitrogen and organosulfur compounds and also reducing the pour point. The shale oil is treated in a two-step process in which the shale oil is first contacted with a hydrotreating catalyst under conditions such that the concentration of organosulfur and organonitrogen constituents is reduced. The hydrotreated shale oil is then contacted with a catalyst under hydrocracking conditions in the presence of molecular hydrogen such that the feedstock is hydrodewaxed to some extent while at least 50 percent of its 750° F.+boiling fraction is converted by hydrocracking to products boiling below 750° F. The catalyst utilized comprises a ZSM-5 zeolite in its hydrogen form combined with a metal having activity for promoting hydrogenation/dehydrogenation reactions. The use of ZSM-5 and related porous, crystalline aluminosilicates results in the conversion of some of the straight and slightly branched chain paraffins into lower boiling components, thereby decreasing the pour point of the treated oil.

The process described in U.S. Pat. No. 4,153,540 has a serious disadvantage if it is desired to convert the raw shale oil into a lube oil base stock or middle distillate of relatively low pour point. Since lube oil base stocks normally boil between about 650° F. and about 1000° F., it is undesirable in treating the shale oil to convert a large portion of its higher boiling constituents to lower molecular weight constituents which boil in the gasoline range. Similarly, since middle distillates normally boil between about 300° F. and 700° F., it is undesirable to convert a large portion of the shale oil's higher boiling constituents into lower molecular weight constituents that boil below about 300° F. It appears, however, that the hydroconversion step disclosed in the process of U.S. Pat. No. 4,153,540 is quite nonselective in that not only are waxy paraffins hydrocracked to lower the pour point but 50 percent or more of the 750° F.+constituents are cracked as well. Such excess hydrocracking results in substantial yield losses when the desired product is a high quality lube oil base stock having a relatively low pour point or a middle distillate having either a low freeze point or both a low pour point and low cloud point.

In order to avoid excessive yield losses in the process disclosed in U.S. Pat. No. 4,153,540, the catalytic conversion step can be carried out with the same catalyst at lower severity conditions. It has been found, however, that although significant yield losses are avoided by this technique, the pour point, cloud point or freeze point of the products are not sufficiently decreased. Evidently, under more mild conditions, the catalyst is very selective to cracking of the straight chain paraffins while leaving a large proportion of the slightly branched chain paraffins in the oil.

Accordingly, it is one of the objects of the present invention to provide a process for converting a raw shale oil or other waxy hydrocarbon feedstock into (1) a lube oil base stock having a relatively low pour point without substantially decreasing the yield of lube oil base stock constituents boiling in the 650° F.+range or, alternatively, into (2) a middle distillate having either a relatively low freeze point or both a relatively low pour point and cloud point without substantially decreasing the yield of middle distillate constituents boiling in the range between about 300° F. and 700° F. It is another object of the invention to provide such a process having the further advantage of selectively hydrocracking the straight chain and slightly branched chain paraffins while not substantially hydrocracking other components to low boiling products.

SUMMARY OF THE INVENTION

In accordance with the invention, it has now been found that the normal paraffin content of waxy hydrocarbon feedstocks can be substantially decreased without significant losses in either lube oil base stock constituents or middle distillate constituents by contacting the feedstock with a dewaxing catalyst in a dewaxing zone under conditions sufficient to reduce the normal paraffin content of the feedstock by converting waxy paraffins into lower molecular weight hydrocarbons, and then contacting the effluent from the dewaxing zone with molecular hydrogen in the presence of a hydrocracking catalyst under conditions such that a further reduction in normal paraffin content is effected.

When it is desired to produce a low pour point lube oil base stock, the process of the invention is normally conducted such that the overall conversion of 650° F.+boiling components to components boiling at or below about 650° F. in the dewaxing and the hydrocracking steps combined is no more than about 20 volume percent, preferably no more than about 10 volume percent. A high quality lube oil base stock having a reduced pour point is then recovered from the effluent of the hydrocracking zone. On the other hand, when it is desired to produce a middle distillate having both a low pour point and low cloud point or just a low freeze point, the process is typically carried out such that the overall conversion of components comprising the waxy hydrocarbon feedstock to components boiling at or below about 300° F. in the dewaxing and hydrocracking steps combined is less than about 25 volume percent, preferably less than about 15 volume percent. Either a high quality diesel fuel or heating oil having a reduced pour point and cloud point or a high quality jet fuel having a reduced freeze point is then recovered from the effluent of the hydrocracking zone. Preferably, the waxy hydrocarbon feedstock is either a dearsenated, raw shale oil that has been subjected to hydrotreatment to remove organosulfur and organonitrogen compounds or a waxy gas oil that may or may not have been previously hydrotreated.

The dewaxing step of the invention is preferably accomplished under hydrodewaxing conditions. For purposes of the present invention, the distinction between dewaxing conditions and hydrodewaxing conditions is the presence of added hydrogen in the latter and the absence of added hydrogen in the former.

A preferred dewaxing catalyst for use in the process of the invention comprises a mixture of a porous, inorganic refractory oxide and a crystalline silica polymorph while a preferred hydrodewaxing catalyst includes a Group VIB metal component and/or a Group VIII metal component on a support comprising a mixture of a porous, inorganic refractory oxide and a crystalline silica polymorph. A preferred hydrocracking catalyst for use in the process of the invention includes a Group VIB metal component and/or a Group VIII metal component on a porous, inorganic refractory oxide support comprising silica-alumina dispersed in a matrix of gamma alumina. The support may also contain an aluminosilicate zeolite having catalytic activity for cracking hydrocarbons. Normally, both the dewaxing or hydrodewaxing zone and the hydrocracking zone will be maintained at a pressure between about 500 p.s.i.g. and about 2500 p.s.i.g. and at a temperature between about 500° F. and about 850° F.

The process of the invention provides a method for converting shale oil and other waxy hydrocarbon feedstocks either into lube oil base stocks having substantially reduced pour points without excessive loss of lube oil base stock constituents, or into middle distillates having reduced pour points, freeze points or cloud points without excessive loss of constituents boiling between 300° F. and 700° F. Thus, the process of the invention provides a method for efficiently producing large quantities of high quality lube oil base stocks or middle distillates from raw shale oil, waxy gas oils and other waxy hydrocarbon feedstocks.

DETAILED DESCRIPTION OF THE INVENTION

Feedstocks for the process of the invention include waxy raffinates, waxy gas oils or waxy distillates boiling above about 650° F., usually in the range from about 650° F. to about 1100° F. Such feedstocks, which often have pour points between about 70° F. and 130° F., may be treated in the process of the invention to produce lube oil base stocks of low pour point, typically at or below about 10° F., or middle distillates of either low pour point and cloud point or low freeze point, normally below 0° F. and −30° F., respectively. Waxy gas oil fractions obtained, for example, from some middle eastern or Indonesian crudes are normally the preferred feedstocks when middle distillates are the desired products. A preferred feedstock for producing lube oil base stock is typically a full boiling range shale oil or shale oil fraction that has been deashed, dearsenated and catalytically hydrotreated. One method by which the dearsenation may be carried out is described in U.S. Pat. No. 4,046,674, the disclosure of which is hereby incorporated by reference in its entirety. The hydrotreating step is typically carried out by contacting the deashed and dearsenated shale oil with hydrogen in the presence of a hydrotreating catalyst, which will normally comprise Group VIB and Group VIII metal components on a porous, inorganic refractory oxide support, under conventional hydrotreating conditions in order to remove organosulfur and organonitrogen compounds by converting them to hydrogen sulfide and ammonia, respectively. A typical hydrotreating step and the catalyst used therein are described in detail in U.S. Pat. No. 4,428,862, the disclosure of which is hereby incorporated by reference in its entirety.

In accordance with an embodiment of the invention, the waxy hydrocarbon feedstock, which may be the entire effluent from the hydrotreating reactor, is passed to a hydrodewaxing reactor where it is directed downwardly through a bed of hydrodewaxing catalyst in the presence of hydrogen at elevated temperature and pressure. Normally, the temperature in the hydrodewaxing reactor will range between about 500° F. and about 850° F., preferably between about 600° F. and 800° F. The pressure in the reactor will normally be between about 500 p.s.i.g. and about 3,000 p.s.i.g., preferably between about 1,500 p.s.i.g. and about 2,500 p.s.i.g. The rate at which the feedstock is passed through the reactor in contact with the catalyst particles is typically set at a liquid hourly space velocity between about 0.3 and about 8.0, preferably between about 0.5 and about 3.0. The hydrogen flow rate through the reactor is generally above about 5,000 standard cubic feet per barrel of feedstock, preferably between about 1,500 and about 10,000 standard cubic feet per barrel.

The catalyst used in the hydrodewaxing reactor is a catalyst which, under the conditions in the reactor, is effective for reducing the normal paraffin content of the feedstock and therefore the pour point of the feedstock by promoting the relatively selective conversion of waxy paraffins, usually paraffins containing straight chains of between about 8 and about 40 carbon atoms, to lower molecular weight hydrocarbons. One type of catalyst suitable for use as the hydrodewaxing catalyst is composed of one or more Group VIB active metal components, particularly the Group VIB metals, oxides and sulfides, and/or one or more Group VIII metal components, particularly Group VIII metals, oxides and sulfides, on a support comprising an intimate mixture of a porous, inorganic refractory oxide and a cracking component comprising a crystalline silica molecular sieve essentially free of aluminum and other Group IIIA metals. Normally, the metals utilized will be nickel and/or cobalt constituents in combination with tungsten and/or molybdenum components. Nickel and tungsten components, especially in a sulfide form, are the most preferred metals for use in this catalyst. The porous, inorganic refractory oxides that can be used as part of the support include the oxides of difficultly reducible metals, particularly those containing aluminum. Examples of such refractory oxides include alumina, silica, beryllia, chromia, zirconia, titania, magnesia, thoria and combinations of these refractory oxides such as silica-alumina and silica-titania. The most preferred refractory oxides are alumina and gamma alumina.

The Group IIIA metal-free crystalline silica molecular sieve which forms a portion of the catalyst support is preferably a material known as silicalite, a silica polymorph that may be prepared by methods described in U.S. Pat. No. 4,061,724, the disclosure of which is hereby incorporated by reference in its entirety. The silicalite is preferably subjected to combustion to remove organic materials and then ion-exchanged to eliminate traces of alkali metal ions. Silicalite does not share the zeolitic property of substantial ion exchange common to crystalline aluminosilicates and therefore contains essentially no zeolitic metal cations. Unlike the "ZSM-5 family" of zeolites, silicalite is not an aluminosilicate and contains only trace proportions of alumina. A more detailed description of the above-discussed hydrodewaxing catalyst including its method of preparation can be found in U.S. Pat. No. 4,428,862.

Another catalyst which can be used in the hydrodewaxing reactor is somewhat similar to the catalyst described above except that a crystalline aluminosilicate of the ZSM-5 type, preferably in an acidic form, is substituted in the support as the cracking component for the crystalline silica molecular sieve essentially free of Group IIIA metals. The crystalline aluminosilicate zeolite will normally be present in the support as a dispersion in the porous, inorganic refractory oxide. The crystalline aluminosilicate zeolite, may be ZSM-5, ZSM-11, ZSM-12, ZSM-23, ZSM-35, ZSM-38 and the like. ZSM-5 zeolite is the most preferred and is fully described in U.S. Pat. No. 3,702,886, the disclosure of which is hereby incorporated by reference in entirety. ZSM-11, ZSM-12, ZSM-23, ZSM-35, and ZSM-38 are all known zeolites and are more fully described respectively in the following U.S. Patents, the disclosures of which are hereby incorporated by reference in their entirety: U.S. Pat. Nos. 3,709,979; 3,832,449; 4,076,842; 4,016,245 and 4,046,859. These zeolites are known to readily adsorb benzene and normal paraffins such as n-hexane and also certain mono-branched paraffins, such as isopentane, but have difficulty adsorbing di-branched paraffins, such as 2,2-dimethylbutane, and polyalkylaromatics, such as meta-xylene. These zeolites are also known to have a crystal density of not less than 1.6 grams per cubic centimeter, a silica-to-alumina mole ratio of at least 12, and a constraint index within the range of 1 to 12. The constraint index is defined in U.S. Pat. No. 4,229,282, the disclosure of which is hereby incorporated by reference in its entirety. The foregoing zeolites have an effective pore diameter greater than 5 Angstroms with the pores defined by 10 membered rings of oxygen atoms, as explained in U.S. Pat. No. 4,247,388, the disclosure of which is hereby incorporated by reference in its entirety. Such zeolites are preferably utilized in the acid form by replacing at least some of the ion-exchanged metal cations in the zeolite with hydrogen ions. This exchange may be accomplished directly with an acid or indirectly by ion exchange with ammonium ions followed by calcination to convert the ammonium ions to hydrogen ions. In either case, it is preferred that the exchange be such that a substantial proportion of the ion exchange sites of the zeolite utilized in the catalyst support is occupied with hydrogen ions. Normally, it is desirable to remove any organic impurities from the zeolite by combustion before the above-described ion exchange procedures are carried out.

The support for the hydrodewaxing catalyst will normally consist essentially of an intimate mixture of the molecular sieve cracking component and a porous, inorganic refractory oxide such as alumina. The proportion of the cracking component in the support may vary in the range between about 2 percent and about 90 percent by weight, preferably between about 20 and 80 weight percent. Typically the support consists essentially of a heterogeneous mixture of the cracking component and alumina or other porous, inorganic refractory oxide.

The hydrodewaxing catalyst is most preferably prepared in particulate form, with the clover-leaf form shown in FIGS. 8 and 8A of U.S. Pat. No. 4,028,227, the disclosure of which is hereby incorporated by reference in its entirety, being preferred. One convenient method for preparing the catalyst involves first comulling a wetted mixture of zeolite or other molecular sieve cracking component, an alumina gel, and an alumina binder material, such as Catapal ® peptized alumina, in proportions appropriate to what is desired in the final catalyst support. Such a comulled mixture is then extruded through a die having suitable small openings in the shape of circles or ellipses, or, as is preferred, three-leaf clovers. The extruded material is cut into small particulates, dried, and calcined, following which the resulting support particles are impregnated with a liquid solution containing the desired Group VIB element in dissolved form, with other active components, such as nickel or other Group VIII metal components, or even with an acidic component, such as phosphorus, known for its property to promote hydrotreating reactions, being optionally included. A specifically contemplated impregnation liquid consists essentially of an aqueous solution of dissolved ammonium metatungstate and nickel nitrate, with the dissolved components being present in the impregnation liquid in proportions sufficient to ensure that the final catalyst contains more than about 15 percent by weight tungsten components calculated as $WO_3$ and more than about 0.5 percent by weight nickel components calculated as NiO. If desired, phosphorus components may also be present in the impregnation liquid so that the final catalyst contains, for example, more than about 0.5 percent by weight phosphorus components calculated as P. After impregnation, the impregnated composite particles are calcined in air at temperatures at or above about 900° F. for a time period sufficient to convert the metal components to oxide forms.

In an alternative method, the foregoing procedure is altered such that, instead of introducing the Group VIB and/or Group VIII metal components into the support by impregnation, they are incorporated into the catalyst by mixing an appropriate solid or liquid containing the desired metal with materials to be extruded through the die. Such a method may prove less expensive and more convenient on a commercial scale than the impregnation method.

Other known methods for depositing the Group VIB and Group VIII metals on the support containing the cracking component may be utilized. It is specifically noted, however, that although the Group VIII metal may undergo some ion exchange with cations in the zeolite or other cracking component during preparation of the catalyst, it is preferred that at least some Group VIII metal be deposited on the support in locations other than the ion exchange sites of the cracking component. To ensure this result, the catalyst is preferably prepared to contain more than the amount of Group VIII metal that would fully occupy the ion exchange sites of the cracking component in the catalyst.

Although the two above-described catalysts are preferred for use in the hydrodewaxing reactor, other catalysts which will decrease the pour point of the reactor feed by selectively converting waxy paraffins to lower molecular weight hydrocarbons may be used. In general, such catalysts will contain a molecular sieve cracking component having a pore size between about 3.0 and 7.0 Angstroms with the pores being typically defined by 10-membered rings of oxygen atoms. The term "pore size" as used herein refers to the diameter of the largest molecule that can be sorbed by the particular molecular sieve in question. The measurement of such diameters and pore sizes is discussed more fully in Chapter 8 of the book entitled "Zeolite Molecular Sieves," written by D. W. Breck and published by John Wiley & Sons in 1974, the disclosure of which book is hereby incorporated by reference in its entirety. One such catalyst comprises a metallic hydrogenation component supported on a mixture of a crystalline aluminum phosphate and a porous, inorganic refractory oxide as described in U.S. Pat. No. 4,310,440, the disclosure of which is hereby incorporated by reference in its entirety. Another such catalyst comprises a metallic hydrogenation component supported on a mixture of a porous, inorganic refractory oxide component and a crystalline silicoaluminophosphate as described in U.S. Pat. No. 4,440,871, the disclosure of which is hereby incorporated by reference in its entirety. Examples of other catalysts which may be used include metallic hydrogenation constituents deposited on mordenite, clinoptilolite, or low-potassium erionite. It will be understood that, although all of the hydrodewaxing catalysts described above contain at least one metallic hydrogenation component, the presence of such a component is not necessary and the support without the hydrogenation component may be used as the dewaxing or hydrodewaxing catalyst.

It has been found that the above-discussed hydrodewaxing catalysts tend to crack straight chain paraffins preferentially to slightly branched chain paraffins. This high selectivity results in the effluent from the hydrodewaxing reactor having a higher than desired pour point. Attempts to reduce the pour point further by operating the hydrodewaxing reactor at more severe conditions is undesirable because a substantial proportion of desired product is converted to lower molecular weight hydrocarbons, thereby resulting in a loss of the desired product. When the desired product is a lube oil base stock, it has now been found that the undesirable loss of lube oil base stock constituents can be avoided while obtaining a further reduction in pour point by contacting the effluent from the hydrodewaxing zone with molecular hydrogen in the presence of a hydrocracking catalyst under conditions such that the overall conversion of 650° F.+components to components boiling at or below 650° F. in the hydrodewaxing and the hydrocracking steps combined is no more than about 20 volume percent, preferably no more than about 10 volume percent. Similarly, when the desired product is a middle distillate, it has been found that the loss of middle distillate components can be substantially decreased while obtaining a further reduction in pour point by contacting the effluent from the hydrodewaxing zone with molecular hydrogen in the presence of a hydrocracking catalyst under conditions such that the overall conversion of components comprising the hydrodewaxing zone feedstock to components boiling at or below 300° F. in the hydrodewaxing and hydrocracking steps combined is no more than about 25 volume percent, preferably no more than about 15 volume percent.

In accordance with the preferred embodiment of the invention, the entire effluent from the hydrodewaxing reactor, which may include ammonia, hydrogen sulfide and lower molecular weight hydrocarbons, is passed to a hydrocracking reactor where it is contacted with a hydrocracking catalyst in the presence of molecular hydrogen. The contacting is normally accomplished by passing the hydrodewaxing reactor effluent downwardly through the hydrocracking catalyst in a suitable reactor vessel under conditions of elevated temperature and pressure. The temperature in the hydrocracking reactor is normally maintained between about 500° F. and about 850° F, preferably between about 600° F. and about 800° F. The pressure in the reactor is normally between about 500 p.s.i.g and about 3,000 p.s.i.g, preferably between about 1,500 p.s.i.g and about 2,500 p.s.i.g. The liquid hourly space velocity of the feed through the hydrocracking reactor is normally maintained between about 0.3 and about 8.0, preferably between about 0.5 and about 3.0. Hydrogen is passed through the reactor at a rate above about 5,000 standard cubic feet per barrel of feedstock, preferably between about 1,500 and about 10,000 standard cubic feet per barrel.

The catalyst used in the hydrocracking reactor promotes reactions that result in a further reduction in the normal and slightly branched paraffin content of the reactor feed. When lube oil base stock is the desired product, the hydrocracking reactor is operated under conditions within the ranges described above such that the overall conversion of the constituents in the hydrodewaxer feed boiling above about 650° F. to components boiling at or below 650° F. in the hydrodewaxing and hydrocracking reactors combined is no more than about 20 volume percent, preferably no more than about 10 volume percent. When a middle distillate is the desired product, the hydrocracking reactor is operated under conditions such that the overall conversion in the hydrodewaxing and hydrocracking reactors combined of the hydrodewaxer feedstock constituents to components boiling at or below about 300° F. is no more than about 25 volume percent, preferably no more than about 15 volume percent.

Normally, the hydrocracking catalyst will be useful for producing middle distillates from heavy gas oils. Examples of such catalysts are disclosed in detail in U.S. Pat. Nos. 4,097,365 and 4,419,271, the disclosures of which are hereby incorporated by reference in their entireties. The catalyst described in U.S. Pat. No. 4,097,365 is a mid-barrel hydrocracking catalyst comprising hydrogenation components on a refractory oxide support comprising silica-alumina dispersed in a matrix of alumina, preferably gamma alumina. The catalyst described in U.S. Pat. No. 4,419,271 is an improvement of the previous catalyst in which a crystalline aluminosilicate zeolite having cracking activity, such as a hydrogen Y zeolite or a rare earth-exchanged Y zeolite, is included in the support. The hydrogenation components in both catalysts are the metals, oxides and sulfides of the Group VIII and/or the Group VIB elements. The most suitable hydrogenation components are selected from the group consisting of the metals, oxides and sulfides of platinum, palladium, cobalt, nickel, tungsten and molybdenum. Preferably, at least one Group VIII metal component and at least one Group VIB metal component are utilized, with the preferred combination being a nickel and/or cobalt component with a molybdenum and/or tungsten component.

The hydrogenation component or components are intimately composited on a base support comprising a mixture of a heterogeneous dispersion of finely divided silica-alumina in a matrix of alumina, preferably gamma alumina. The catalyst of U.S. Pat. No. 4,419,271 also contains, in intimate mixture with the dispersion, a suitable zeolite having catalytic activity for cracking hydrocarbons. These zeolites include naturally occurring and synthetic crystalline aluminosilicates such as faujasite, mordenite, Zeolite Y, Zeolite X, Zeolite L, Zeolite omega, Zeolite ZSM-4, Zeolite beta and their modifications. These and other such zeolitic molecular sieves are known to have activity for cracking hydrocarbons when a substantial portion of their ion exchange sites are occupied with hydrogen ions or multivalent metal-containing cations particularly rare earth cations.

A preferred zeolite for use in the support is one produced by first ammonium exchanging a Y zeolite to a sodium content between about 0.6 and 5 weight percent, calculated as $Na_2O$, calcining the ammonium-exchanged zeolite at a temperature between about 600° F. and 1650° F. in the presence of steam at a water vapor partial pressure of at least 0.2 p.s.i.a. to reduce the unit cell size of the ammonium-exchanged zeolite to a value in the range between about 24.40 and 24.64 Angstroms, and then ammonium exchanging the steam calcined zeolite to replace at least 25 percent of the residual sodium ions and obtain a zeolite product of less than about 1.0 weight percent sodium, preferably less than about 0.6 weight percent sodium, calculated as $Na_2O$. Such a Y zeolite is described in detail in U.S. Pat. No. 3,929,672, the disclosure of which is hereby incorporated by reference in its entirety. The same or a substantially similar zeolite is sold by the Linde Division of Union Carbide Corporation as LZY-82 zeolite.

Another preferred Y zeolite is prepared in the same manner as described above except that instead of exchanging the steam calcined zeolite with ammonium ions, the zeolite is leached with a solution of an organic chelating agent, such as EDTA, or an inorganic or organic acid. Preferably, the steam calcined zeolite is leached with a dilute solution of hydrochloric or sulfuric acid ranging in concentration between about 0.01 N and about 10 N. Zeolites prepared in the above-described manner are disclosed in U.K. Pat. Application No. 2,114,594 published Aug. 24, 1983, the disclosure of which is hereby incorporated by reference in its entirety.

The most preferred zeolite for use in the support is a material known as LZ-10, a zeolitic molecular sieve available from the Linde Division of Union Carbide Corporation. LZ-10 is a modified Y zeolite having a silica-to-alumina mole ratio between about 3.5 and about 6.0, a surface area between about 500 and about 700 $m^2$/gram, a unit cell size between about 24.25 and 24.35 Angstroms, a water adsorption capacity, at 4.6 mm Hg water vapor partial pressure and 25° C., less than about 8 percent by weight, preferably less than about 5 percent by weight, of the zeolite, and an ion-exchange capacity less than 20 percent of that of a sodium Y zeolite of comparable silica-to-alumina ratio.

Depending on the conditions at which the hydrodewaxing and hydrocracking reactors are operated, a large portion of the effluent from the hydrocracking reactor will be substantially free of waxy paraffinic hydrocarbons and will boil either in the lube oil base stock range of 650° F. to 1000° F. or in the middle distillate range of 300° F. to 700° F. The desired product is recovered from the hydrocracking reactor effluent by fractionation. If the desired product is a lube oil base stock, it will have a relatively low pour point and can be blended with other lube oil base stocks to produce a lube oil of desired characteristics. If the desired product is a jet fuel, it will normally boil between about 300° F. and about 550° F. and will have a relatively low freeze point. Finally, if the desired product is a diesel fuel or heating oil, it will typically boil between about 550° F. and about 700° F. and will have both a relatively low pour point and low cloud point.

In the embodiment of the invention described above, the entire effluent from the hydrotreating zone is passed to the hydrodewaxing zone and the entire effluent from the hydrodewaxing zone is passed to the hydrocracking zone. It will be understood that the process of the invention is not limited to this particular flow scheme. For example, it may be desirable to remove ammonia, hydrogen sulfide and gaseous hydrocarbons from the effluent of the hydrotreating zone, the hydrodewaxing zone or both. It may also be advisable in some instances to distill the effluent from either zone or both zones to remove liquid hydrocarbons boiling below about 650° F. Although in the embodiment of the invention described above, the effluent from the hydrotreating zone is passed into a separate hydrodewaxing reactor and then to a separate hydrocracking reactor, it will be understood that the latter two reactors can be combined into one vessel containing two beds of different catalysts arranged such that the effluent from the hydrotreating zone would first pass through the hydrodewaxing catalyst bed and then through the hydrocracking catalyst bed. This embodiment of the invention would eliminate the need for a second reactor vessel.

Although this invention has been primarily described in conjunction with a preferred embodiment thereof, it is evident that many alternatives, modifications, and variations will be apparent to those skilled in the art in the light of the foregoing description. Accordingly, it is intended to embrace within the invention all such variations, modifications and alternatives as are within the spirit and scope of the appended claims.

I claim:

1. A process for converting a waxy hydrocarbon feedstock containing a substantial proportion of hydrocarbonaceous material boiling above about 650° F. into a product hydrocarbon having a reduced content of normal paraffins as compared to said feedstock which comprises:
   (a) contacting said waxy hydrocarbon feedstock with a dewaxing catalyst in a dewaxing zone under conditions such that the normal paraffin content of said feedstock is reduced;
   (b) contacting the effluent from said dewaxing zone with a hydrocracking catalyst in the presence of hydrogen in a hydrocracking zone under conditions such that a further reduction in the normal paraffin content of said feedstock is effected; and
   (c) recovering said product hydrocarbon having a reduced content of normal paraffins from the effluent of said hydrocracking zone.

2. A process as defined by claim 1 wherein said dewaxing catalyst comprises a molecular sieve containing pores defined by 10-membered rings of oxygen atoms.

3. A process as defined by claim 2 wherein said dewaxing catalyst comprises a crystalline silica polymorph.

4. A process as defined by claim 3 wherein said dewaxing catalyst further comprises alumina.

5. A process as defined by claim 4 wherein said silica polymorph comprises silicalite.

6. A process as defined by claim 2 wherein said hydrocracking catalyst comprises at least one hydrogenation component selected from the group consisting of Group VIB metal components and Group VIII metal components on a porous, inorganic refractory oxide support comprising silica-alumina dispersed in a matrix of alumina.

7. A process as defined by claim 6 wherein said matrix comprises gamma alumina.

8. A process as defined by claim 7 wherein said hydrocracking catalyst comprises a Group VIB metal hydrogenation component and a Group VIII metal hydrogenation component.

9. A process as defined by claim 8 wherein said Group VIB metal hydrogenation component comprises a tungsten component or molybdenum component and said Group VIII metal hydrogenation component comprises a nickel component or cobalt component.

10. A process as defined by claim 2 wherein said dewaxing catalyst comprises a crystalline zeolite of the ZSM-5 family.

11. A process as defined by claim 10 wherein said zeolite of the ZSM-5 family is selected from the group consisting of ZSM-5, ZSM-11, ZSM-12, ZSM-23, ZSM-35 and ZSM-38.

12. A process as defined by claim 2 wherein said hydrocracking catalyst comprises at least one hydrogenation component selected from the group consisting of Group VIB metal components and Group VIII metal components on a support comprising a crystalline aluminosilicate zeolite having catalytic activity for cracking hydrocarbons and a porous, inorganic refractory oxide comprising silica-alumina dispersed in a matrix of alumina.

13. A process as defined by claim 12 wherein said matrix comprises gamma alumina.

14. A process as defined by claim 13 wherein said hydrocracking catalyst comprises a Group VIB metal hydrogenation component and a Group VIII metal hydrogenation component.

15. A process as defined by claim 14 wherein said Group VIB metal hydrogenation component comprises a tungsten component or molybdenum component and said Group VIII metal hydrogenation component comprises a nickel component or a cobalt component.

16. A process as defined by claim 12 wherein said zeolite comprises a modified hydrogen crystalline aluminosilicate Y zeolite having a unit cell size between about 24.25 and about 24.35 Angstroms and a water adsorption capacity, at 4.6 mm Hg water vapor partial pressure and 25° C., less than about 8 percent by weight of said zeolite.

17. A process as defined by claim 2 wherein said dewaxing zone and said hydrocracking zone are maintained in the same reactor.

18. A process as defined by claim 2 wherein the effluent from said dewaxing zone is treated to remove liquids boiling below about 650° F., ammonia, hydrogen sulfide and light hydrocarbon gases, and the remaining portion of said effluent is passed to said hydrocracking zone.

19. A process as defined by claim 2 wherein substantially all of the effluent from said dewaxing zone is contacted with said hydrocracking catalyst in the presence of hydrogen in said hydrocracking zone.

20. A process as defined by claim 1 wherein said product hydrocarbon comprises a middle distillate and the contacting in steps (a) and (b) is such that the overall conversion of components comprising said feedstock to components boiling at or below about 300° F. is no more than about 25 volume percent.

21. A process as defined by claim 1 wherein said product hydrocarbon comprises a lube oil base stock and the contacting in steps (a) and (b) is such that the overall conversion of components in said feedstock boiling above about 650° F. to components boiling at or below about 650° F. is no more than about 20 volume percent.

22. A process for converting a waxy hydrocarbon feedstock containing a substantial proportion of hydrocarbonaceous material boiling above about 650° F. into a middle distillate having a reduced content of normal paraffins as compared to said feedstock which comprises:
   (a) contacting said waxy hydrocarbon feedstock in the presence of hydrogen with a hydrodewaxing catalyst in a hydrodewaxing zone under conditions such that the normal paraffin content of said feedstock is reduced;
   (b) contacting the effluent from said hydrodewaxing zone with a hydrocracking catalyst in the presence of hydrogen in a hydrocracking zone under conditions such that a further reduction in the normal paraffin content of said feedstock is effected, wherein said contacting in steps (a) and (b) is such that the overall conversion of components comprising said feedstock to components boiling at or below about 300° F. is no more than about 25 volume percent; and
   (c) recovering said middle distillate of reduced normal paraffin content from the effluent of said hydrocracking zone.

23. A process as defined by claim 22 wherein said hydrodewaxing catalyst comprising a molecular sieve containing pores defined by 10-membered rings of oxygen atoms.

24. A process as defined by claim 23 wherein said molecular sieve comprises silicalite or ZSM-5.

25. A process as defined by claim 24 wherein said hydrodewaxing catalyst further comprises at least one hydrogenation component selected from the group consisting of Group VIB metal components and Group VIII metal components.

26. A process as defined by claim 25 wherein said hydrodewaxing catalyst comprises a Group VIB metal hydrogenation component and a Group VIII metal hydrogenation component.

27. A process as defined by claim 26 wherein said hydrocracking catalyst comprises silica-alumina dispered in a matrix of alumina.

28. A process as defined by claim 27 wherein said hydrocracking catalyst further comprises a Y zeolite.

29. A process as defined by claim 28 wherein said Y zeolite comprises LZ-10 zeolite.

30. A process as defined by claim 22 wherein said middle distillate comprises a jet fuel.

31. A process as defined by claim 22 wherein said middle distillate comprises a diesel fuel or heating oil.

32. A process as defined by claim 22 wherein said waxy hydrocarbon feedstock comprises a waxy gas oil.

33. A process for converting a waxy hydrocarbon feedstock containing a substantial proportion of hydrocarbonaceous material boiling above about 650° F. into a lube oil base stock having a reduced pour point as compared to said feedstock which comprises:

(a) contacting said waxy hydrocarbon feedstock in the presence of hydrogen with a hydrodewaxing catalyst in a hydrodewaxing zone under conditions such that the pour point of said feedstock is reduced;

(b) contacting the effluent from said hydrodewaxing zone with a hydrocracking catalyst in the presence of hydrogen in a hydrocracking zone under conditions such that a further reduction in pour point of said feedstock is effected, wherein said contacting in steps (a) and (b) is such that the overall conversion of components in said feedstock boiling above about 650° F. to components boiling at or below about 650° F. is no more than about 20 volume percent; and (c) recovering said lube oil base stock of reduced pour point from the effluent of said hydrocracking zone.

34. A process as defined by claim 33 wherein said hydrodewaxing catalyst comprising a molecular sieve containing pores defined by 10-membered rings of oxygen atoms.

35. A process as defined by claim 34 wherein said molecular sieve comprises silicalite or ZSM-5.

36. A process as defined by claim 35 wherein said hydrocracking catalyst comprises silica-alumina dispered in a matrix of alumina.

37. A process as defined by claim 36 wherein said hydrocracking catalyst further comprises a Y zeolite.

38. A process as defined by claim 37 wherein said Y zeolite comprises LZ-10 zeolite.

39. A process as defined by claim 35 wherein said hydrodewaxing catalyst further comprises a tungsten component or molybdenum component and a nickel component or cobalt component.

40. A process as defined by claim 33 wherein said waxy hydrocarbon feedstock comprises a dearsenated shale oil which has been hydrotreated to remove organonitrogen and organosulfur components.

* * * * *